Figure 1:
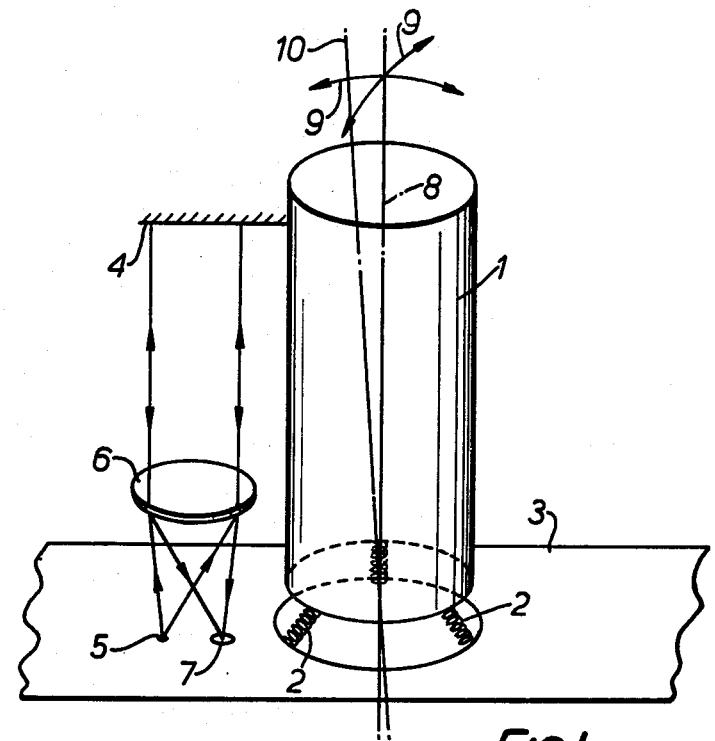

United States Patent [19]

Hobbs et al.

[11] 4,152,729
[45] May 1, 1979

[54] IMAGE MOTION COMPENSATION SYSTEM

[75] Inventors: William E. Hobbs, Danbury; William J. R. Clark, Chelmsford, both of England

[73] Assignee: Elliott Brothers (London) Limited, Chelmsford, England

[21] Appl. No.: 856,574

[22] Filed: Dec. 1, 1977

[30] Foreign Application Priority Data

Dec. 9, 1976 [GB] United Kingdom ............... 51544/76
Mar. 11, 1977 [DE] Fed. Rep. of Germany ....... 2710738

[51] Int. Cl.² ............................................. H04N 3/22
[52] U.S. Cl. .............................. 358/222; 250/231 GY; 358/109
[58] Field of Search .................... 250/216, 231 GY; 350/316; 244/3.11, 3.14; 356/149, 152, 250; 358/222, 109, 125

[56] References Cited

U.S. PATENT DOCUMENTS

| | | | |
|---|---|---|---|
| 2,517,612 | 8/1950 | Varian | 250/231 GY |
| 3,515,881 | 6/1970 | Philbrick et al. | 358/222 |
| 3,536,824 | 10/1970 | Chmillon | 358/222 |
| 3,577,205 | 5/1971 | Hobrough | 358/222 |
| 3,617,131 | 11/1971 | Taguchi | 356/149 |
| 3,918,814 | 11/1975 | Weiser | 356/152 |

Primary Examiner—Robert L. Griffin
Assistant Examiner—Joseph A. Orsino, Jr.
Attorney, Agent, or Firm—Diller, Ramik & Wight

[57] ABSTRACT

The invention provides an image motion compensation arrangement for enabling stabilization of the line of sight of a scanned imaging system mounted on a vehicle. In one example the scanned imaging system is a television camera assembly which is resiliently mounted and carries a plane mirror on to which is directed, via an auto-collimating lens, light from a light emitting diode. Light reflected by the plane mirror passes back through the auto-collimating lens to be received by a detector having quadrant receiving surfaces which resolve the complex motion of the camera assembly during movement of the vehicle into two orthogonal components defining the angular error caused by the motion in the sight line of the camera. The two orthogonal components are utilized to provide a pair of electrical signals utilizable to correct for the image motion resulting from the rotation of the sight line.

10 Claims, 4 Drawing Figures

IMAGE MOTION COMPENSATION SYSTEM

This invention relates to an image motion compensation (I.M.C.) system for a scanned imaging system, for example a television camera, positioned in a moveable vehicle such as an airframe.

Known I.M.C. systems have used angular accelerometers to measure the motion of a television camera assembly and to derive analogue voltages which may be used to compensate the sight line motion of the camera by optical, mechanical or electromagnetic means.

The use of angular accelerometers to measure the motion of the camera assembly has disadvantages. Firstly, angular accelerometers are costly pieces of equipment. Secondly, angular accelerometers are prone to drift. Thirdly, in some applications, such as an aircraft head-up display, the T.V. display is presented with respect to the local frame of reference, i.e. with respect to the airframe. Angular accelerometers effectively stabilise the camera sight line with respect to space co-ordinates and when a head-up display is required, compensative filtering is required to reject outputs from the accelerometer representative of aircraft manoeuvres, i.e. low frequency angular rates, whilst allowing utilisation of higher frequency angular rates for sight line compensation. The correct filtering is difficult to achieve.

Finally, the high frequency performance of an angular accelerometer is severely limited due to a relatively poor signal-to-noise performance, so that it is usually not practicable to obtain satisfactory performance above a frequency of about 50 $H_z$.

This invention seeks to provide an image motion compensation system which avoids the need to use an angular accelerometer.

According to this invention, there is provided an image motion compensation arrangement for enabling stabilisation of the line of sight of a scanned imaging system mountable on a vehicle comprising sensing means for sensing angular components of motion of the system relative to the vehicle and detector means responsive to the sensing means for providing electrical signals representative of the angular components.

Preferably said scanned imaging system is a television camera assembly.

The term "television camera assembly" is intended to include those components of a television camera, the angular motion of which, relative to the vehicle, would result in motion of the television image. This may include the whole camera, but may be only the tube and yoke.

Preferably, the sensing means comprises a reflector moveable with the camera assembly and a light source moveable with the vehicle and arranged to illuminate the reflector to provide a reflected image of the source whereby relative angular movement between the vehicle and the camera assembly produces a movement of the reflected image.

Preferably, the reflector is a plane reflector.

Conveniently, focusing means is provided for focusing light from the light source onto the reflector and the light source is positioned in a focal plane of the focusing means.

Preferably, the focusing means is operative to receive the reflected image and to provide a focused image of the light source in the said focal plane.

Advantageously, the focusing means is an auto-collimating lens.

Preferably, the detector means comprises a quadrant detector operative to resolve the angular components of motion along a pair of orthogonal axes.

Preferably, the quadrant detector is a silicon quadrant cell.

It is preferred to provide resilient means for mounting the camera assembly on a vehicle to protect the assembly from undesirable shocks and vibrations.

Figure 2:
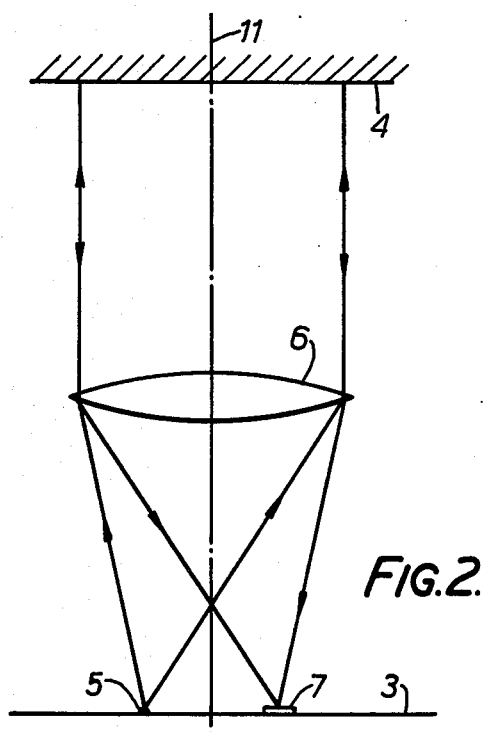
Figure 3:
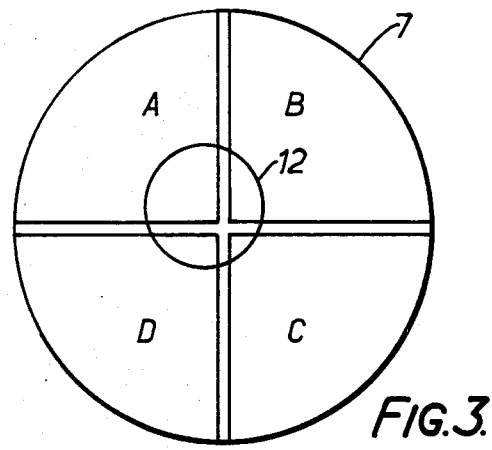
Figure 4:
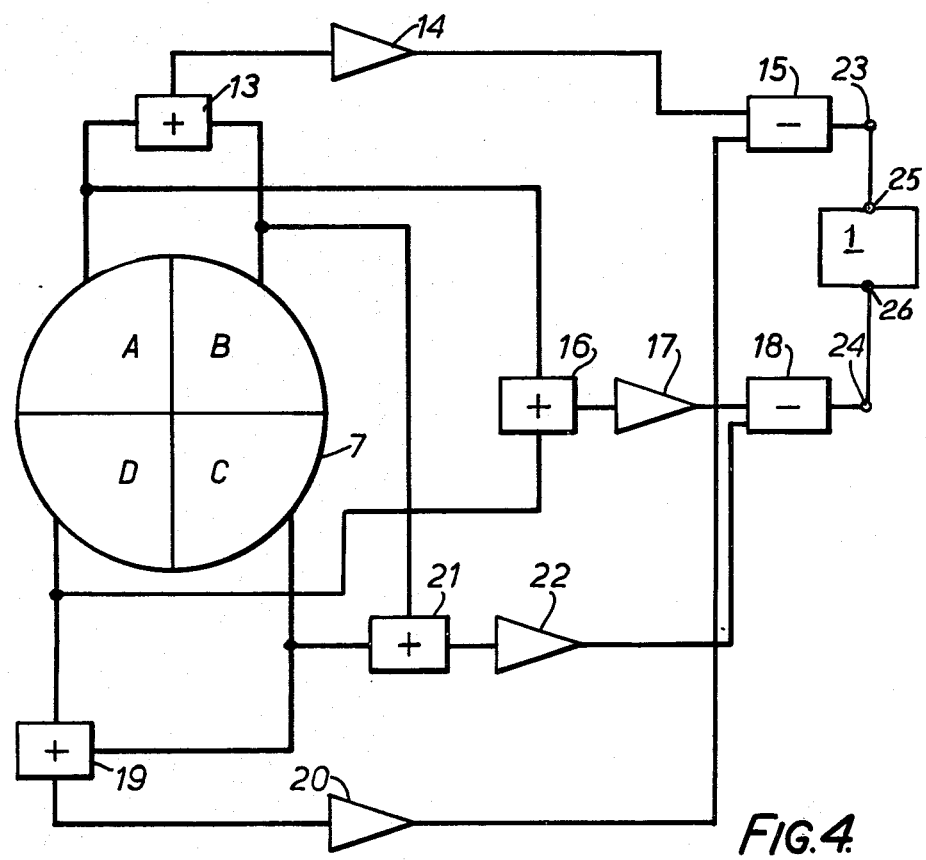

This invention will now be described further, with reference to the accompanying drawings in which FIG. 1 is a highly schematic perspective view of one image motion compensation arrangement in accordance with the invention;

FIG. 2 is a more detailed view of the sensing arrangement and detector of the arrangement of FIG. 1, FIG. 3 is an explanatory diagram for illustrating the operation of the detector of FIG. 1 and FIG. 4 shows the detector circuit arrangement for extracting the required compensation signals from the quadrant detector of FIG. 3.

Referring to FIG. 1, a camera assembly 1 is mounted by means of resilient members 2 onto a reference plane 3 forming part of a moveable vehicle. A plane mirror 4 is carried by the assembly 1 and is illuminated by a light emitting diode light source 5 with a parallel beam of light formed by an auto-collimating lens 6 which forms the focusing means. Light from the diode 5 is reflected by the plane mirror 4 back through the lens 6 and is focused onto a detector 7 which will be described in more detail later. The light source 5, lens 6 and the mirror 4 form the sensing means.

The camera assembly 1 has a sight line shown by chain dashed line 8. During movement of the vehicle a complex motion of the camera assembly will occur but this motion will have angular components which cause the assembly 1 to angularly rotate about the mounting 2 relative to the reference plane 3. This angular motion can be resolved into two orthogonal components, indicated by the arrows 9 and results in an angular error in the camera sight line which moves to a new position, shown by the chain dashed line 10.

This invention senses directly these angular components of camera assembly motion relative to the vehicle reference plane 3 and, in conjunction with the detector 7, enables these components to be resolved into two orthogonal components and enables a pair of electrical signals to be obtained for correcting the image motion caused by the sight line rotation.

Referring to FIG. 2, where like parts to those of FIG. 1 bear like reference numerals, the sensing system and detector are shown in enlarged detail.

The chain dashed line 11 represents the optical axis of the lens 6 and the light emitting diode 5 and the detector 7 are positioned on the vehicle reference plane 3, one on each side of the axis 11 in a focal plane of the lens 6.

In a steady state condition with no relative angular motion between the camera assembly 1 and the vehicle reference plane 3, an image of the diode 5 will be formed on the detector 7 at an equal distance from the axis 11 as the diode 5. When vehicle motion causes angular rotation of the assembly 1 relative to the reference plane 3, this will cause a corresponding rotation of the mirror 4 about the axis 11.

The rotation of the mirror 4 will cause a displacement of the image of the diode 5 at the detector 7. The image, therefore, moves across the detector in the plane 3 and this movement is detected in a manner shortly to be described to enable electrical signals to be obtained to correct for image motion and stabilise the camera sight line following the angular rotation.

If the mirror 4 rotates about the axis 11 by an angle $d\theta$, and the collimating lens 6 has a focal length f, then the displacement D of the image across the detector 7 is given by $$D = 2fd\theta$$

The sensing system described is only sensitive to angular rotation of the mirror 4 about its centre, i.e. the axis 11, relative to the plane at right angles to the axis 11. It is not sensitive to lateral motion of the mirror in its own plane or along the axis 11 nor is it sensitive to the rotation of the mirror 4 about the axis 11 in the plane orthogonal to the axis 11. Consequently, only the angular components of rotation of the assembly 1 relative to the plane 3 are measured and none of the lateral components.

The detector 7 detects the motion of the image in the plane 3 and resolves this motion into two orthogonal components to provide electrical signals from which image motion compensation signals may be obtained. To obtain this function a preferred embodiment of the invention uses a quadrant detector shown in FIG. 3.

In FIG. 3, the quadrant detector 7 is provided by a silicon quadrant cell known per se and having four detecting quadrants A, B, C and D, each of which provides a voltage output in dependence upon the position of a light image 12 falling onto the detector.

The light image 12 is, in the present case, the image of the diode 5 formed by the sensing system and the position of this image will, as explained above, vary with the angular motion of the camera assembly 1. The detector 7 resolves the motion of this image into the orthogonal components and by suitable combination of the output voltages from the various quadrants, two analogue voltages $V_x$ and $V_y$ can be obtained, representative of the resolved components.

If the output voltages from the quadrants A, B, C and D are $V_A$, $V_B$, $V_C$ and $V_D$ respectively then $$V_x \alpha (V_B + V_C) - (V_A + V_D)$$

$$V_y \alpha (V_A + V_B) - (V_C + V_D)$$

The detector circuit for extracting $V_x$ and $V_y$ is shown in FIG. 4.

Referring to FIG. 4, outputs from the detector quadrants A and B are taken to respective inputs of an adder 13 to provide a signal $(V_A + V_B)$. The $(V_A + V_B)$ output from the adder 13 is passed via a buffer amplifier 14 to the plus input of a subtractor 15.

A second adder 16 receives inputs $V_A$ and $V_D$ from the A and D quadrants and provides an output $(V_A + V_D)$ which is fed via amplifier 17 to the minus input of a second subtractor 18.

A third adder 19 receives $V_C$ and $V_D$ inputs from the C and D quadrants respectively of the detector 7 and provides an output $(V_C + V_D)$ which is fed via a buffer amplifier 20 to the second and minus input of the subtractor 15.

A fourth adder 21 similarly receives inputs $V_B$ and $V_C$ from the B and C quadrants respectively and provides an output $(V_B + V_C)$ which is passed via a buffer amplifier 22 to the positive input of the subtractor 18.

The subtractors 15 and 18 provide outputs at terminals 23 and 24 of $V_y$ and $V_x$ respectively.

These voltages $V_x$ and $V_y$ may be applied to appropriate deflection coils 26, 25, respectively associated with the camera tube to offset the image by an amount to compensate for image motion due to the sensed angular rotation.

In a particular case where the television camera is engaged in a low light operation and an image intensifier precedes the tube, then the voltages $V_x$ and $V_y$ may be applied to the current drive for a pair of deflection coils mounted on the image intensifier coupled to the low light television sensor tube, so as to deflect the image forming photo-electrons along these same axes to stabilise the image on the camera tube.

We claim:

1. An image motion compensation arrangement for enabling stabilization of the line of sight of a television camera assembly resiliently mounted on a vehicle, including an optical system consisting of a first part constituted by a reflector and a second part constituted by a light source and a photodetector arranged to receive an image of the light source after reflection at said reflector, one part being rigidly coupled to the television camera assembly and the other part being rigidly coupled to the vehicle, said camera assembly including a camera tube, means for deriving from the photodetector electrical signals representative of the angular components of motion of the television camera assembly relative to the vehicle, and means responsive to said derived electrical signals for offsetting an output image of said camera tube by an amount to compensate for said angular components of motion.

2. An arrangement as claimed in claim 1 wherein said first part is the part rigidly coupled to the television camera assembly, and the said second part is the part rigidly coupled to the vehicle.

3. An arrangement as claimed in claim 1 wherein said television camera assembly comprises a part only of a television camera said part comprising a camera tube and a yoke therefor.

4. An arrangement as claimed in claim 1 wherein the reflector is a plane reflector.

5. An arrangement as claimed in claim 4 wherein the optical system is an auto collimator in which both the light source and the photodetector are positioned in the same focal plane of a lens so that a parallel beam of light is produced which is incident upon the plane reflector, returned to the lens and brought to a focus at the photodetector.

6. An arrangement as claimed in claim 1 wherein the photodetector comprises a quadrant detector operative to resolve the angular components of motion along a pair of orthogonal axes.

7. An arrangement as claimed in claim 6 wherein the quadrant detector is a silicon quadrant cell.

8. An arrangement as claimed in claim 1 wherein said camera tube includes deflection coil means responsive to said derived electrical signals.

9. An arrangement as claimed in claim 8 wherein the reflector is a plane reflector.

10. An arrangement as claimed in claim 9 wherein the optical system is an auto collimator in which both the light source and the photodetector are positioned in the same focal plane of a lens so that a parallel beam of light is produced which is incident upon the plane reflector, returned to the lens and brought to a focus at the photodetector.

* * * * *